United States Patent Office 2,836,359
Patented May 27, 1958

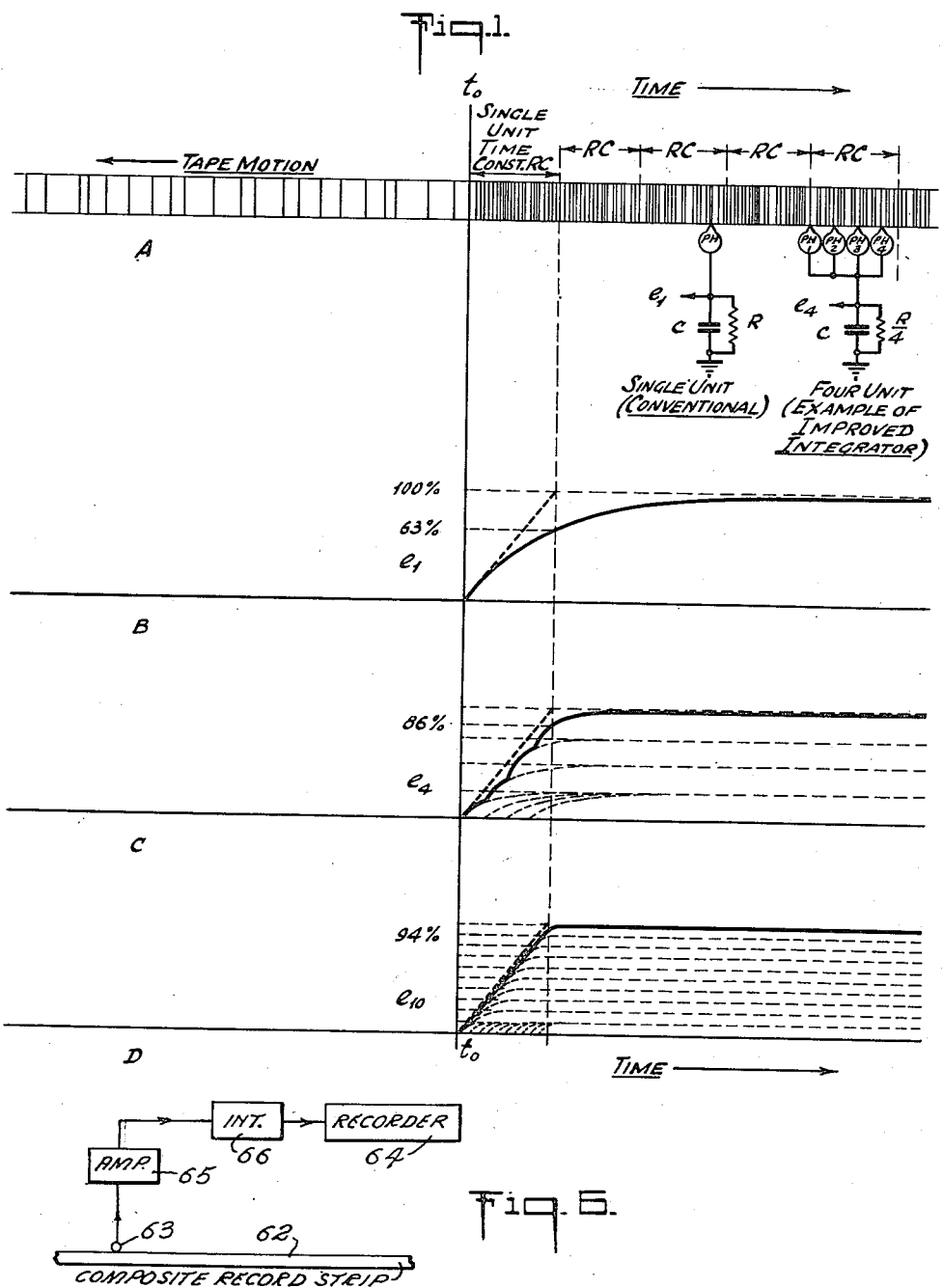

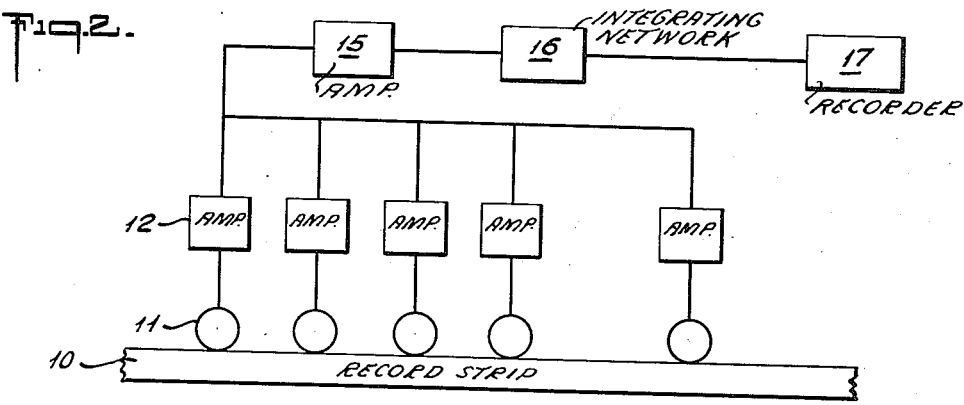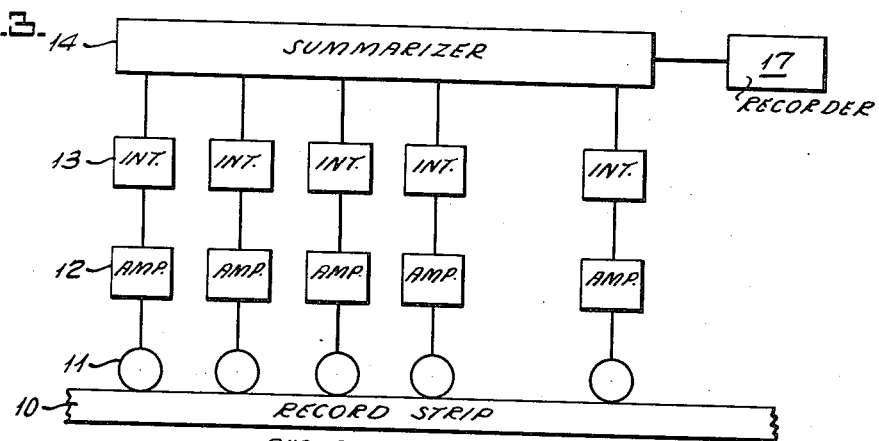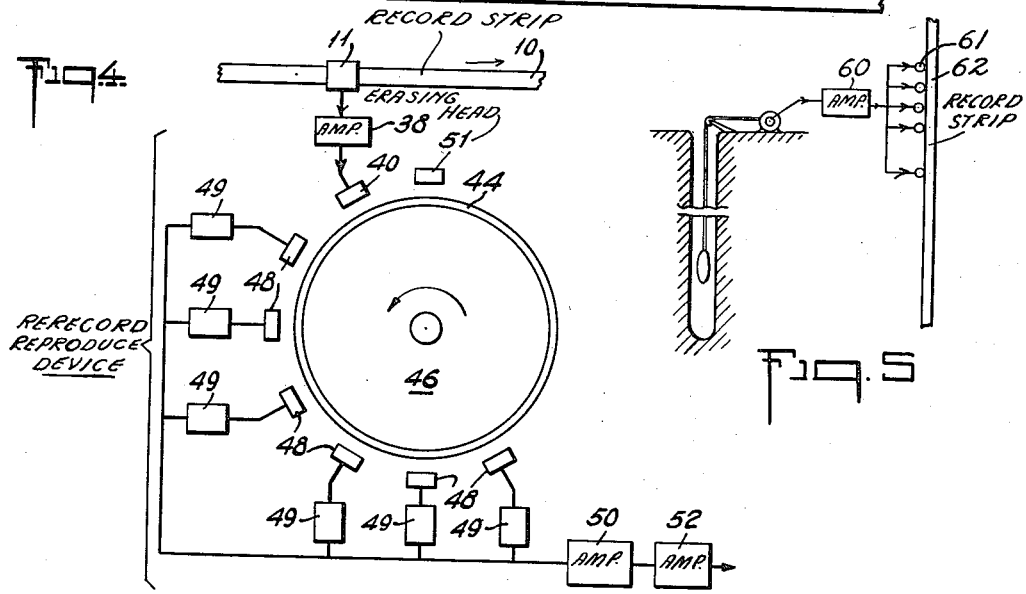

2,836,359

INTEGRATION OF ELECTRICAL SIGNALS

Roy P. Mazzagatti, Bellaire, Tex., assignor to The Texas Company, New York, N. Y., a corporation of Delaware Application November 1, 1954, Serial No. 465,810

8 Claims. (Cl. 235—61)

This invention relates to improvements in geophysical prospecting including exploration of bore holes and earth formations in general. More particularly, it concerns continuously determining the average rate of occurrence of randomly occurring events as in the measurement of penetrative radiation.

Broadly, the invention contemplates a method of geophysical prospecting which comprises receiving a sequence of randomly occurring events in pulse form, compositing said sequence of events with a plurality of identical sequences of said events, each sequence delayed after the other by a selected time interval, integrating the resulting composite in an RC integrating circuit with an integrating time constant equal to said selected time interval, thereby producing a log of the average rate of occurrence of said events.

More specifically, the invention contemplates obtaining a log of a succession of such randomly occurring events recorded on a suitable medium such as a magnetic strip member and thereafter playing back the recorded events with a plurality of play-back channels, each play-back head being positioned in sequence along the medium at equal intervals so that the time delay between scanning of any given point on the medium by a play-back head and its immediately adjacent play-back head is substantially equal to a selected integrating time constant; obtaining from each of these play-back heads an output of intelligence in the form of an electrical current; and feeding the resulting output to an integrating circuit or circuits having the aforesaid selected integrating time constant, thereby producing a final and desired log of the average rate of occurrence of the aforesaid events.

As is known, when the intensity of penetrative radiation is measured by using a detector to convert its individual quanta and photons into corresponding electrical pulses, the pulses then may either: (1) be counted and divided by the number of seconds during which the radiation was being detected to determine its average intensity for the whole detection period; or (2) they may be integrated and applied to a rate-meter to determine any variations in the average intensity which may have occurred within the detection period, this being done when such variations are to be expected and are of interest, as, for example, when the detector is moved along a large, non-uniform source of radiation in making the measurements, e. g., in radioactivity bore hole logging.

As is well known, radioactive radiations occur at random intervals of time. This is true even in the case of a radioactive source of constant strength. Therefore, in measuring the the rate of these radiations one usually obtains a different value each time the measurement is made. However, this variability of the measured rate becomes smaller, or in other words, the successive measurements become more nearly the same, when the time is made longer over which the measurements are made. Thus it is customary to take extended measurements of radioactive radiation rates when high reliability is required. The value of the rate is obtained simply by counting the total number of detected events in a measured interval of time and dividing by that amount of time, thus obtaining the average rate over that interval.

In the conventional counting rate meter ("Integrating circuits and counting rate meters," page 183 of Electron and Nuclear Counters, by Serge A. Korff, 1946), this averaging is done continuously and electrically. It is not necessary to stop, total the counts, and divide by the time. This computation is being done continuously by the integrating circuit, a simple resistor and capacitor combination, in which electric charge is fed into the capacitor at a rate proportional to the counting rate of the detector, and electric charge leaks off the capacitor through the resistor at a rate determined by the "time constant" of the integrating circuit. The voltage on the capacitor is a fairly faithful average of the voltages that have been thereon during the time which has just passed. Therefore, one can measure this voltage with a vacuum tube voltmeter and thus obtain a figure which is proportional to the counting rate over the time interval which has just passed.

The time interval over which this average is automatically measured in the conventional counting rate meter is dependent upon the "time constant" of the integrating circuit, and the time constant of the circuit is obtained in seconds by multiplying the resistor value in ohms by the capacitor value in farads. Thus a 1. megohm resistor in combination with a 5.0 microfarad capacitor gives a time constant of 5 seconds. Now it should be kept in mind that the averaging time is not exactly equal to this time constant, but is dependent upon it: The automatic electrical averaging does not take place merely over one time constant, that is, over the most recent 5 seconds in the example given. Unfortunately, it is always averaging to some extent also the many counts that preceded the desired interval. It is as if it had too long a memory and could never take a new average without including some old data it should have forgotten. In the example given, the rate meter would be taking a weighted average and would be weighting data at different times as follows: data taken at present moment weighted 1.0, data 5 seconds ago weighted 0.37, data 10 seconds ago, 0.14, data 20 seconds ago, 0.02, etc.

Now it can be seen that a long time constant can be both a good thing and a bad thing. It must be long in order to make the computed average rate reliable, and yet it must not be so long that the memory effect prevents it from following quick changes in the true radiation rate. This latter requirement is usually expressed in other words as the need for a fast response. The conventional counting rate meter simply makes the best possible compromise between these two objectives, setting the time constant at some value such that a good enough average is obtained with as great a speed of response as possible. The present invention overcomes the need for this compromise and provides a fast response without sacrificing reliability of the measured average rate. In other words, whereas in the conventional counting rate meter the time constant for averaging and the time constant for speed of response are inseparable, in the present invention the effect achieved is as if the two time constants were independent of each other.

The speed of response depends inversely on the time constant of the integrating network, i. e., the product of R and C. Moreover, the reliability of the average depends directly on RC, so that a reduction in RC to increase speed of response would only result in a less reliable average. However, reliability depends also on the value of the counting rate, and yet the speed of response does not. Therefore, the essence of this invention is found in a method and means for increasing the effective counting rate so that one thereby improves the quality of the average without at the same time reducing the speed of response, or alternatively so that one thereby maintains the quality of the average while at the same time increasing the speed of response.

The larger the actual counting rate, i. e., the radioactive intensity, the better the average one obtains. Unfortunately, the intensities involved in natural radioactivity bore hole logging are usually very low. Therefore, in radioactivity bore hole logging it is often the case that no time constant can be fully satisfactory since ones which are short enough to afford good definition of interfaces between strata may not adequately average out statistical variations and vice versa. Moreover, as will be apparent from the foregoing, the problem is not really solved by the prior art expedient, of providing logging tool rate meters and/or recorders with means for choosing from among pluralities of integrators having different time constants or, what is equivalent, means for adjusting the time constant of single integrators. While this expedient may make it easier to choose some preferred compromise value, it does not offer a real solution.

Therefore, what has been needed for some time is a way of integrating which is sufficiently fast-acting to produce sharp upward and downward voltage excursions in response to significant differences in successive average occurrence rates thereby to provide clear indications even if the tool is moved rapidly but at the same time is sufficiently slow acting to average out statistical variations.

The controlling parameters in the counting rate meter are related as shown below:

$$\text{Reliability of average} \propto \sqrt{(\text{count rate}) \times RC}$$

$$\text{Speed of response} \propto 1/RC$$

$$\text{output signal} \propto (\text{count rate}) \times R$$

All three quantities are desired as large as possible. This result can be achieved by increasing the count rate and reducing RC. Now with a given detector and a given intensity of radiation, it is not obvious how to increase the count rate, but the present invention provides a way of effectively increasing the count rate under these circumstances.

The advantages to be obtained from this invention can be seen in a simple numerical example. Suppose one had a count rate of N, a resistance, R, and a capacity, C. Then in the conventional rate meter, one would have reliability $\sqrt{NRC}$, speed $1/RC$, and output NR (using the above proportionalities as if they were exact equations, for the purpose of example). The chart below shows that an increase by a factor of 4 in the effective counting rate would give several choices for improved performance over the conventional rate meter. For example, the first embodiment of the improved rate meter shows that a reduction by a factor of 4 could be permitted in the capacitor, with the result that both speed and output would be increased by 4 without sacrificing reliability at all.

Table I

|  | Conventional Rate Meter | Factor of improvement with respect to conventional rate meter in three embodiments of rate meter with improved integrator circuit [1] | | |
| --- | --- | --- | --- | --- |
|  |  | Embodiment No. 1 | Embodiment No. 2 | Embodiment No. 3 |
| Count Rate | N | 4N | 4N | 4N |
| Resistor | R | R | R/4 | R |
| Capacitor | C | C/4 | C | C |
| Reliability | $\sqrt{NRC}$ | ×1 | ×1 | ×2 |
| Speed of Response | 1/RC | ×4 | ×4 | ×1 |
| Output | NR | ×4 | ×1 | ×4 |

[1] Basis of comparison here is that all rate meter integrators (new and old) have same effective time constant for averaging.

As stated above, the essence of this invention is in the increasing of the effective count rate. One further note is required, however, namely, that this must be an effective increase in the number of separate and independent events counted per unit time. It will not suffice, for example, to insert a device that simply multiplies each event by 10 and records a rate apparently 10 times as great. For if that were done, there would be no better smoothing or averaging of the count rate than if it were not done. In other words, the reliability would not be improved by an increase in count rate unless the increase represented additional events, entirely independent of all others counted. The reasons for this are found in the theory of the statistics of random counting.

One method by which the present invention accomplishes the necessary increase in the effective count rate is to record the counted events on a moving element, such as on a magnetic tape, and thereafter to run the tape again past not one but several magnetic playback heads, which in turn add their outputs together in a common amplifier that feeds into a conventional rate meter. The several playback heads thus observe truly independent events which originally occurred at different times, and yet in the present invention these independent events from several different moments of time are recorded as if occurring simultaneously.

For a more complete and better understanding of the invention, reference is now made to the drawings in which:

Fig. 1 shows a schematic drawing of an integrator employing four pickup heads; in addition graphs illustrating the output curves for various numbers of pickup heads are shown;

Fig. 2 shows an embodiment which is a refinement of Fig. 1;

Fig. 3 shows a further embodiment in which the separate signals are integrated and then summed;

Fig. 4 shows another embodiment that contains one pickup head, a delay device and a plurality of pickup heads associated with the delay;

Figs. 5 and 6 together show an embodiment in which a plurality of input heads are connected to the original signal and one output head is employed.

The operation of the invention is illustrated in Fig. 1. At A is represented a tape which has already been filled with data from a single recording head, and is pictured in the process of being played back, in one case with a single playback head and integrator circuit having output $e_1$, and in the other case with four heads and associated circuitry comprising together the improved integrator circuit having output $e_4$. The tape is moving from right to left at a rate of 10 inches per second, or, it can be regarded as if the tape were stationary and the recording heads move from left to right as time progresses. The transverse lines marked on the tape indicate recorded events, such as pulses from a Geiger tube, for instance. They are shown as occurring at a rate whose average is constant up until the time $t_0$ is reached, whereupon the rate abruptly increases by fire. This step-up in rate serves well to illustrate comparatively the working of the conventional rate meter and the present rate meter with improved integrator circuit.

The single playback head and conventional rate meter give an output signal, $e_1$, plotted at B. Note that at the end of one time constant, RC, after $t_0$, the output $e_1$ is only 63% complete. An ideal response might be defined as one which would rise in a straight line, arriving at 100% complete at the end of one time constant. This ideal response is shown by the heavy dashed line in the graph. Thus the speed of response of the conventional, single-head device may be said to be only 63% of the ideal. We will assume in this example with the single-unit head that $RC=1$ second, and therefore, since tape speed is 10 inches per second, the length along the tape which corresponds to one time constant is 10 inches. This amount of tape, the amount traversed in one single-unit time constant, will be designated one single-unit length constant.

At C is shown the output from one form of the present invention, in which four playback heads are used. These four heads are equally spaced in such a way that in one fourth of a single-unit time constant the four heads will have between them traversed one single-unit length constant along the tape. That is, four heads spaced 2.5 inches apart will each have traversed 2.5 inches of tape in ¼ second, and these four sections of tape taken together comprise the 10-inch section which was formerly traversed by the single-unit device in 1 second. Thus to all intents and purposes the time constant for averaging is still one second and yet the time constant for speed of response is ¼ second. The playback heads PH–1, –2, –3, and –4, combine their outputs and feed them into the integrator circuit having the same capacity as in the single-unit device but ¼ the resistance, thus providing ¼ the time constant. This is the output $e_4$, plotted as a solid line at C. The dashed lines merely show each of the four components alone and indicate the graphical construction by which the total curve may be obtained. Here at the end of one single-unit time constant the response is seen to be 86% of the ideal, a substantial improvement over the 63% figure for the single-unit.

At D is shown the response of a 10-unit device, wherein the ten heads are spaced 1 inch apart, and the integrator circuit has capacity C and resistance $R/10$. At the end of one single-unit time constant, the response in this case is 94% of the ideal. Obviously, the more units used, the nearer the response approaches the ideal, and yet a reasonable number such as 4 or 10 gives a substantial improvement over the conventional single-unit device. The following table shows how closely the response of multiple unit devices at the end of one comparable single-unit time constant approaches the ideal. By "comparable single-unit" is meant a single-unit device with the same effective time constant for averaging.

Table II

| Number of units | Percent ideal at end of one comparable single-unit time constant, percent |
| --- | --- |
| 1 | 63 |
| 2 | 75 |
| 3 | 82 |
| 4 | 86 |
| 5 | 88 |
| 6 | 90 |
| 7 | 92 |
| 8 | 93 |
| 9 | 93.5 |
| 10 | 94.2 |

The multiple-unit device described above can be seen to have fulfilled the requirements outlined previously for effectively increasing the counting rate with the result that real advantages follow therefrom. In the particular embodiment described above and in Fig. 1 (embodiment 2 of Table I) the advantage is a fourfold increase in the speed of response without loss of reliability or output. In the conventional single-unit device, on the other hand, such an increase in speed is obtained only at the expense of reliability and in some cases output also.

In the foregoing no mention has been made of the elements in the several channels of the playback circuit other than the heads and the integrator element. As indicated in Fig. 2, the strip member 10 is moved in scanning relationship with a plurality of recording heads 11 and the output from each of these recording heads is fed into a set of channel amplifiers 12. These channel amplifiers feed into a common amplifier 15 in which the outputs from the playback heads are mixed and further amplified. The common amplifier feeds into the appropriate integrating network 16 (the simple resistor-capacitance combination shown in Fig. 1) having the selective integration time constant equivalent to the time delay between adjacent playback heads. The integrator feeds into a recorder 17.

Fig. 3 illustrates a modification wherein each playback channel includes a channel amplifier 12 and an integrator 13. The outputs from the several integrators 13 are fed to an electronic voltage summarizer 14 which in turn feeds to a recorder 17.

As to the question of the desirable spacing of the heads, it is preferred that they be spaced apart the distance equal to one time constant of the multiple-unit integrator (not one time constant of the original single-unit integrator with which the multiple-unit instrument was being compared in Fig. 1). The importance of this can be realized from considering the case of the ideal integrator such as gave the dashed straight line response in Figs. 1B, C, and D. This ideal integrator would always be reading the average number of events occurring in that length of tape which it has just completed traversing in the most recent time interval of one time constant, i. e., in the most recent length constant of tape. It does not "remember" any events prior to this interval. Several heads in the ideal multiple-head integrator must be spaced accordingly by their corresponding length constant as shown by the following example. For tape speed 10 inches per second, time constant ¼ second, the tape length constant is 2.5 inches. A multiple-head system should have 2.5 inches between heads. In this way all the events on the tape within the range of the heads is entering into the average which is being recorded at any time. Six such heads, for instance, would be averaging all events in a length of 15 inches. However, if the spacing were less than 2.5 inches, say 2 inches, then there would be useless duplication in the average. Each head would be overlapping 0.5 inch of the region of tape already being covered by the adjacent head. This would do no harm to the record, but it represents an inefficient use of apparatus. If the spacing were greater than 2.5 inches, say 3 inches, then the average so taken would be over a non-continuous range of the tape. There would be several 0.5-inch gaps between the heads which would not be contributing to the average at any one time. This error is worse than that of too close spacing, since it would result, in some instances, in an actual distortion of the record. These same conclusions hold for the case of non-ideal (or real) integrator circuits, though not with the same rigor perhaps, since the real integrator element inevitably has some memory and therefore does not have the hard and fast limits to its true averaging time, or in other words, to its tape length constant.

In summary then, the purpose of this invention is to provide an improved count rate integrator wherein the reliability of the average rate is improved with respect to the single-unit integrator of the conventional count rate meter without at the same time reducing speed of response, or alternatively wherein the speed of response is increased with respect to the single-unit integrator of the conventional count rate meter without at the same time impairing the reliability of the average. This end is achieved broadly by increasing the effective count rate (i. e., the counting of statistically independent events) and making appropriate adjustments in the parameters R and C of the integrating network to take advantage of this increase. In particular, the end is achieved by using multiple play-back heads with common output on a single head record and spacing these multiple heads a distance apart equal to the product of tape speed and the time constant of the integrator circuit to which the composite signal is then fed.

Instead of employing the apparatus illustrated in Fig. 2, one may use a single playback head which in turn transfers the recorded sequence of events to a magnetic rubber-coated drum. This drum rotates continuously and imparts the recorded sequence of events to multiple heads around its periphery, which heads in turn may mix their outputs in an integrator circuit of reduced time constant just as in the system of Fig. 2.

Thus, as shown in Fig. 4, a single pickup head 11 is in operative association with the strip medium 10. The reproduced pulses are fed over an amplifier 38 to the recording head 40 of a device comprising an endless magnetic medium 44 extending entirely around the rim of a drum 46. Beyond the position of the recording head 40 in the direction of rotation of the drum 46 there is a plurality of pickup heads 48. Each playback head feeds into its respective channel amplifier 49. The outputs from the channel amplifiers feed into a common amplifier 50, which in turn feeds into an integrator 52. An erasing head 51 prepares the endless magnetic medium 44 for continuous operation.

It is contemplated that a procedure that is the reverse of that described with reference to the foregoing Figs. 2, 3, and 4 may be employed and which would involve recording originally with multiple heads and thereafter playing back this record with a single head. It will be recognized that in the normal procedure previously described, the purpose is achieved by the trick of superimposing the events which originally took place at time $t$ with those that took place at $t$ plus ¼ second, $t$ plus ½ second, and $t$ plus ¾ second. Furthermore, it will be recognized that this same end is achieved just as well by using four recording heads and superimposing four records on the one tape, each record being ¼ second (or 2.5 inches) out of step with its adjacent record. Then, upon playing back with one playback head, the output from the tape again provides a composite, in which are superimposed the events that originally took place at time $t$ with those that took place at time $t$ plus ¼ second, those at $t$ plus ½ second, and those at $t$ plus ¾ second. For example, see Figs. 5 and 6 where it will be observed that the signals being picked up are amplified in an amplifier 60 and fed to a plurality of recording heads 61. Recording heads 61 are spaced apart along a record strip 62 by the requisite distance for providing the desired time difference between each of the plurality of identical logs thus created on the strip 62, as it is driven past the recording heads 61. Thus the remainder of the aforementioned reverse procedure is carried out, when the composite log, which has been recorded on strip 62, is taken off by a single pickup head 63 (Fig. 6) and fed to a recorder 64 via an amplifier 65 and an integrating network 66 (in accordance with the explanation previously made in connection with the earlier embodiments, insofar as the requirements of the integrator are concerned in order to obtain the desired time constant).

Obviously, many modifications and variations of the invention as hereinbefore set forth may be made without departing from the spirit and scope thereof, and therefore only such limitations should be imposed as are indicated in the appended claims.

I claim:

1. In a system of geophysical prospecting or the like wherein there is provided a reproducible record of randomly occurring events in pulse form spaced along a time base as a function of time, means for continuously scanning said record at a predetermined rate along the time base comprising a plurality of separate scanning means substantially equally spaced apart in sequence a predetermined distance along the time base such that the time interval between scanning of any given point on said record by immediately adjacent scanning means is substantially equal to a selected value, means for deriving individual outputs from the respective scanning means, signal integrating means having a time-constant that is substantially equal to the selected time interval, and means for simultaneously applying the individual outputs of the respective scanning means to the integrating means, whereby the output of the integrating means is proportional to the average rate of occurrence of said events throughout substantially the total distance scanned by the plurality of scanning means during the selected time interval.

2. In a system of geophysical prospecting or the like wherein there is provided a reproducible record of randomly occurring events in pulse form spaced along a time base as a function of time, means for continuously scanning said record at a predetermined rate along the time base comprising a plurality of separate scanning means substantially equally spaced apart in sequence a predetermined distance along the time base such that the time interval between scanning of any given point on said record by immediately adjacent scanning means is substantially equal to a selected value, means for deriving individual outputs from the respective scanning means, a plurality of integrating means corresponding to the number of separate scanning means each having a time constant that is substantially equal to the selected time interval, means for applying the individual outputs of the respective scanning means to a corresponding integrating means, summarizing means for producing an output signal that is proportional to the sum of a plurality of signals, and means for simultaneously applying the individual outputs of the respective integrating means to said summarizing means, whereby the output of the summarizing means is proportional to the average rate of occurrence of said events throughout substantially the total distance scanned by the plurality of scanning means during the selected time interval.

3. In a system of geophysical prospecting or the like wherein there is obtained a signal comprising a succession of randomly occurring events in pulse form, means for continuously deriving simultaneously separate signals for each of a plurality of successively occurring portions of said signal, said portions being of predetermined substantially equal duration and in substantially non-overlapping contiguous relation, and means for integrating and summarizing said separate signals, said last named means employing a time constant in the integration of said signals substantially equal to the duration of each of said portions, thereby to provide an output that is proportional to the average rate of occurrence of said events throughout the total signal represented by the plurality of successively occurring portions.

4. In geophysical prospecting involving obtaining a log of randomly occurring events in pulse form comprising means for forming a composite log of said pulses, said composite consisting of a plurality of separate identical logs of the events whose occurrence rate is being determined, said separate logs being continuously obtained in sequence with a time interval between each substantially equal to a selected integrating time constant, and means for feeding said composite to an integrating circuit having said selected time constant, thereby producing a final log of the average rate of occurrence of said events.

5. In geophysical prospecting involving obtaining a log of randomly occurring events in pulse form, the combination comprising means for continuously obtaining on a recording medium a log of said events occurring in succession, means for continuously scanning said medium with a plurality of separate scanning means substantially equally spaced apart in sequence such that the time delay between scanning of any given point on said medium by each pair of immediately adjacent scanning means is substantially equal to a selected integrating time constant, means for obtaining from each of said scanning means an output of intelligence in the form of an electrical current, and means for feeding said output to an integrating circuit having said selected time constant and thereby producing a final log of the average rate of occurrence of said events.

6. In geophysical prospecting involving obtaining a log of randomly occurring events in pulse form, the combination comprising means for recording said random events on a moving strip member, means for playing back the recorded events thereafter by a plurality of separate scanning heads substantially equally spaced apart in sequence such that the time delay between scanning of any given point on said strip member by a scanning head and its immediately adjacent scanning head is substantially equal to a selected integrating time constant, means for obtaining from each of said scanning heads an output in the form of an electrical current, and means for feeding said output to an integrating circuit having said selected time constant, thereby producing a final log of the average rate of occurrence of said events.

7. The invention according to claim 6 in which the randomly occurring events are recorded on a magnetic strip medium.

8. The invention according to claim 6 in which the strip member is moved during playback at the same average rate of speed as during said recording.

References Cited in the file of this patent

UNITED STATES PATENTS 2,698,875　　Greenwood _____ Jan. 4, 1955